Aug. 8, 1950 C. J. FITCH 2,517,995

PRINTING TELEGRAPH APPARATUS

Filed March 8, 1945 5 Sheets-Sheet 1

INVENTOR
CLYDE J. FITCH
BY
W. M. Wilson
ATTORNEY

Aug. 8, 1950 C. J. FITCH 2,517,995

PRINTING TELEGRAPH APPARATUS

Filed March 8, 1945 5 Sheets-Sheet 2

INVENTOR
CLYDE J. FITCH
BY
W. M. Wilson
ATTORNEY

PRINTING TELEGRAPH APPARATUS

Filed March 8, 1945 5 Sheets-Sheet 3

INVENTOR
CLYDE J. FITCH
BY
ATTORNEY

Aug. 8, 1950 C. J. FITCH 2,517,995

PRINTING TELEGRAPH APPARATUS

Filed March 8, 1945 5 Sheets-Sheet 4

INVENTOR
CLYDE J. FITCH

BY W. M. Wilson
ATTORNEY

Aug. 8, 1950 C. J. FITCH 2,517,995

PRINTING TELEGRAPH APPARATUS

Filed March 8, 1945 5 Sheets-Sheet 5

INVENTOR
CLYDE J. FITCH

BY

W. M. Wilson

ATTORNEY

Patented Aug. 8, 1950 2,517,995

UNITED STATES PATENT OFFICE 2,517,995

PRINTING TELEGRAPH APPARATUS

Clyde J. Fitch, Endicott, N. Y., assignor to International Business Machines Corporation, New York, N. Y., a corporation of New York Application March 8, 1945, Serial No. 581,609

13 Claims. (Cl. 164—113)

This invention relates to keyboard controlled tape punches or transmitters used in printing telegraph systems. Its primary object is to provide an apparatus of this class by means of which a larger than normal number of keys can be basically represented by a given code combination, that is to say, an apparatus in which the number of keys of a keyboard controlling the telegraphic transmission or tape perforation is considerably greater than the number of different code combinations of the code employed.

Many of the commercial telegraph transmission lines operate on a 5-unit code. Such a code affords only thirty-one different usable code combinations, which is less than the number required for ordinary telegraph transmission. The alphabet takes 26 combinations, or 52 for capital and small letters, the numbers 10 more, and punctuation and functional signals additional ones. The capacity of the 5-unit code can be extended by the use of shift signals, which indicate that the character signals which follow belong to a different group than those which went before. The shift signals may be inserted manually by appropriate keys, or automatically upon a change from one group of keys of the keyboard to another.

It is the primary object of my invention to provide a keyboard controlled machine of the kind described having improved signal control means adapted to control either a punch or a transmitter, which includes means operated automatically by the character keys of the keyboard, to cause the signal control means to insert a shift signal each time the operator shifts from one zone of the keyboard to another.

A particular object of the invention is to provide an improved keyboard operated tape punch for punching a 5-unit code tape in such a way as to provide for all of the characters of a standard typewriter keyboard, including capital and small letters, the ten digits, and a number of punctuation marks.

In a preferred form of the invention zone shift signals are controlled automatically from the character keys, while case shift signals are controlled by case shift keys and case shift is possible in each zone.

Other objects of the invention will be pointed out in the following description and claims and illustrated in the accompanying drawings, which disclose, by way of example, the principle of the invention and the best mode, which has been contemplated, of applying that principle.

For the purpose of illustration, the invention is shown as applied to a typewriter punch adapted to prepare telegraphic tape, but it will be understood that it can be applied equally as well to direct transmission apparatus. In a preferred form of the invention the code used is a 5-unit code suitable for transmission over commercial channels. Apparatus for translating the code into a printed page is disclosed in my copending application Serial No. 583,227, filed March 17, 1945 now Patent 2,405,297, granted August 6, 1946 to C. J. Fitch.

*The typewriter*

Figures 1, 2:
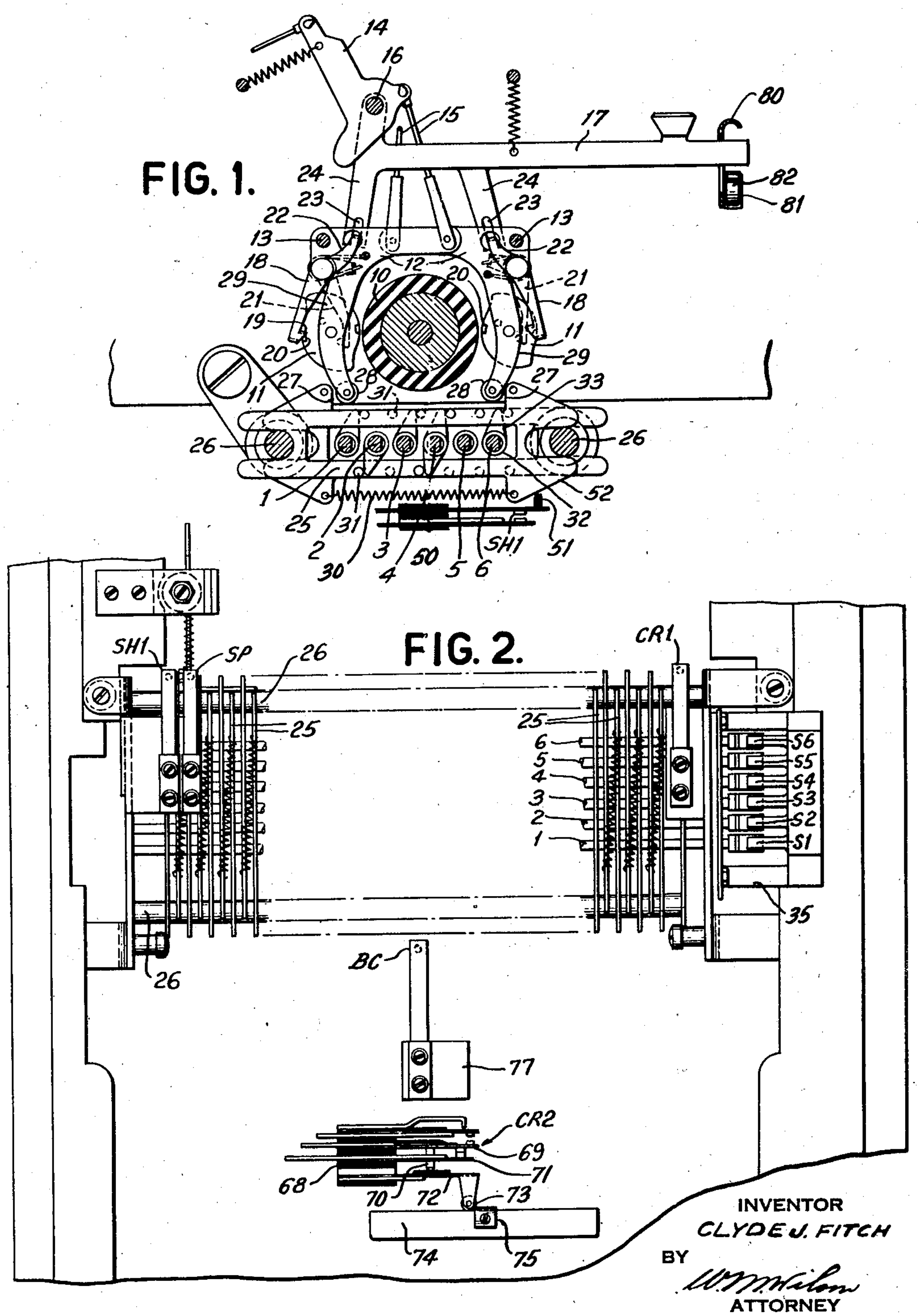
Fig. 1 is a vertical section through a keyboard and permutation mechanism adapted for setting up code in accordance with the present invention.
Fig. 2 is a partial bottom plan view of the permutation mechanism and auxiliary switching devices.

The typewriter is basically similar to the one shown in Patents 2,165,614 and 2,355,297. As shown in Fig. 1, the typewriter comprises a power driven roller 10, at the front and back of which are arranged two sets of cams 11. The cams are journaled upon oppositely arranged bell cranks 12 pivoted upon stationary rods 13. The upper ends of the bell cranks 12 are connected to their related typebar operating levers 14 by links 15. The levers 14 are pivoted upon a stationary rod 16, upon which key bars 17 are also pivoted. The key bars control latch levers 18 having latches 19 engaging lugs 20 on the related cams, to hold them against the action of spring influenced arms 21, which tend to rotate the individual cams, to throw their eccentric peripheries toward the roller 10. The latch levers 18 are pivoted on the bell cranks 12 and have upwardly extending arms 22 with bent over ends engaging in slots 23 of the downwardly extending arms 24 of their related key bars. Upon actuation of a key bar, the latch lever releases the cam, which is rocked against the roller 10 by the spring arm 21 and caused to execute one-half revolution, in the course of which it rocks out the bell crank 12 and operates the typebar (not shown). This mechanism is all well known and does not require further description here.

Beneath the power roller 10 is a set of six permutation bars 1, 2, 3, 4, 5, 6 suitably mounted in the frame of the machine for rocking motion about their axes. The permutation bars are rocked in various combinations as the different keys are actuated, through slides 25 guided for limited horizontal movement upon grooved bars 26 and having shoulders 27 against which bear rollers 28 mounted upon downward extensions 29 of the bell crank levers 12. The slides 25 are in two groups, one group being moved forward by the operation of their related keys, while the other is moved rearward, and they are held in their normal unoperated position by springs 30 interconnecting each slide with its neighboring slide. Each slide has six studs 31 projecting alternately upon opposite sides. The studs 31 of the slides operated by the right hand cams 11 (Fig. 1) are on the lower bars of the slides, while those of the slides operated by the left hand cams are on the upper bars of the slides. The permutation bars 1—6 are flattened on one side and have distributed along them, and spaced by collars 32, arms 33 which extend upward or downward, to cooperate with the studs 31 on the slides 25 and which have apertures with a straight side, complementary to the flat-sided cross section of the bars 1—6, to prevent rotary movement of the arm on the bar. The number and position of the arms 33 arranged for cooperation with the studs of a particular slide determine which permutation bars will be rocked by that slide. The permutation bars are biased by springs (not shown) in clockwise direction.

Figure 4:
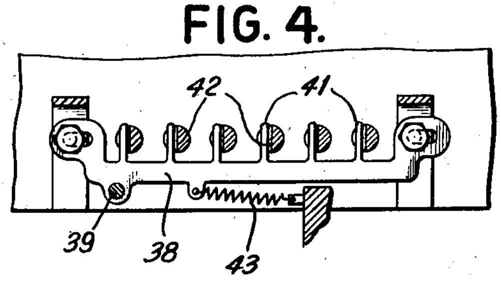
Fig. 4 is a vertical section of the permutation contact mechanism at right angles to Fig. 3, showing the universal bar.
Figure 3:
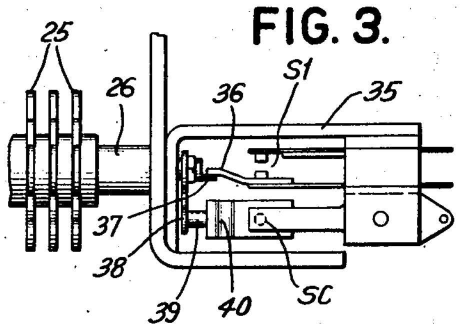
Fig. 3 is a detail vertical elevation of the permutation contact mechanism.

At the right end (Fig. 2) of the set of permutation bars a group of six selector contacts S1, S2, S3, S4, S5, S6 and one common contact SC are mounted upon a switch frame 35. The lower spring of each selector contact carries a strip of insulating material 36 (Fig. 3) pressed firmly against flat cam piece 37 on the end of the related permutation bars 1—6 by the spring action of the contact spring. Any permutation bar which is rocked will close its selector contact. The common contact SC is operated by a horizontally slidable universal bar 38 carrying a stud 39, which bears against a strip of insulating material 40 fixed to one of the springs of the contact SC. The universal bar 38 has on its upper edge teeth 41 which stand in front of flat faces 42 of the permutation bars 1—6, so that the bar 38 will be cammed to the left (Fig. 4), against the pull of a spring 43, when any one of the permutation bars is rocked. Thus, the rocking of any permutation bar will close the common contact, this closure being timed to occur after the selector contacts S1—S6 have been closed.

Figure 5:
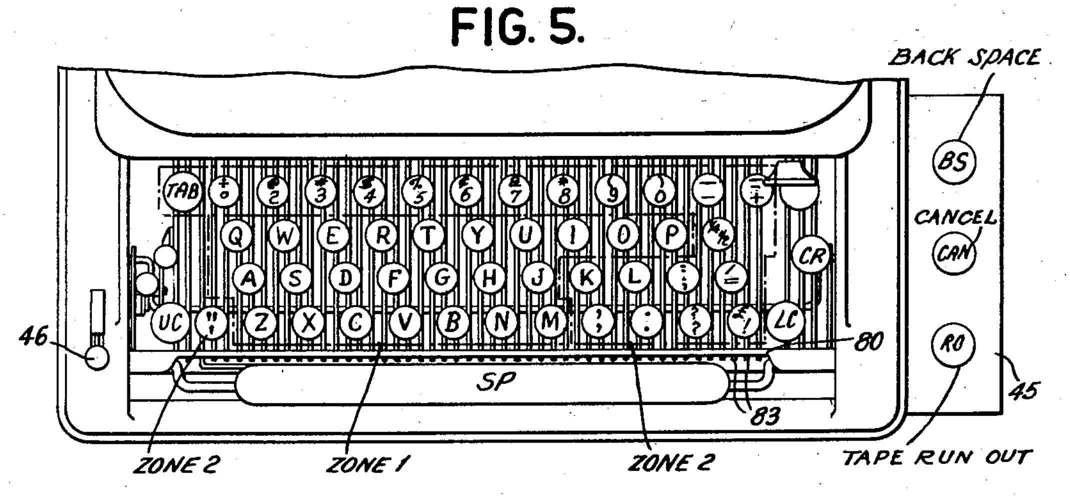
Fig. 5 is a plan view of the keyboard.

*Keyboard.*—The keys of the keyboard are classified in two different zones, as indicated in Fig. 5 by dot and dash lines. Zone 1 includes the keys for all the letters of the alphabet, with the exception of *k* and *l*. Zone 2 includes the keys for the letters *k* and *l*, the TAB. key, the numeral keys, and the keys for various symbols and punctuation marks—twenty-three in all. There are also a carriage return key CR, an upper case key UC, a lower case key LC and a space bar SP, all of which are not in either zone. The twenty-four letters pertaining to the zone 1 keys, plus the carriage return, line feed, letters shift (lower case), figures shift (upper case), and space use the twenty-nine standard 5-unit code combinations of the Baudot code (see Fig. 11). The Baudot code for the letter *l* is used as a zone shift signal indicating a shift to zone 2 and the code for letter *k* is used as a zone shift signal indicating a shift to zone 1. This exhausts the thirty-one different usable combinations of the 5-unit code. The characters pertaining to the keys in zone 2 use the same code combinations as those used for the twenty-four letters in zone 1; that is, each character in zone 2 is paired with a character in zone 1, in the use of the same code combination.

The zone shift signals are inserted automatically, in a manner to be described, whenever a key in one zone is operated after a key in the other zone has been operated, and also upon depression of a key when the apparatus is in a normal condition, to indicate the zone of the first key depressed. The "normal" condition will be explained later. It is the condition to which the apparatus is restored when the tape is run out at the end of a message, or when a part of the recording is cancelled, or when the main switch is turned off. A given 5-unit code combination may call for the operation of either one of two different keys of the printer at the receiving station. The function of the zone shift signals is to cause the printer at the receiving station to take a setting which will route the following character code combinations to the proper zone of the keyboard.

The code combinations are set up on the permutation bars 1—5. Permutation bar 6 is used for differentiating the keys of zone 2 from the keys of zone 1.

At the right side of the keyboard is a switch box 45 with three push buttons for controlling special functions of the punch. The push button BS is for back-spacing, the push button CAN for cancelling erroneous recordings in the tape, and the push button RO is for running out tape at the end of a message. At the left side of the keyboard is the main switch lever 46. The switches controlled by these push buttons and the lever 46 will be referred to later, in connection with the wiring diagram.

*Miscellaneous contacts.*—Besides the contacts previously described as being operated by the permutation bars, there are additional contacts which will now be mentioned. Fig. 2 shows three contacts SH1, SP, and CR1 which will be referred to, respectively, as the shift contact No. 1, the space contact, and the carriage return contact No. 1. Fig. 1 shows contact SH1. It is mounted under the permutation bar mechanism and comprises two contact springs supported in a block of insulation 50, the upper contact spring having a button of insulation 51 positioned so as to be engaged by the inclined surface 52 of the slide 25, when the latter is moved to the right by operation of either of the case shift keys UC or LC (Fig. 5) as will be explained presently. The other two contacts SP and CR1 are of identiquently, it always engages the related punch operating lever.

The shaft 102 is controlled by a one revolution clutch 110 normally latched by an armature detent 111 operated by a magnet MCL. The shaft is latched with eccentric 100 in its uppermost position, in which position the right ends of the punch operating levers 98 are positioned just above the hooks 104 of the punch selecting levers 105. When the magnet MCL is energized the one-revolution clutch is engaged and the shaft 102 makes one revolution. If the punch selecting lever 105 pertaining to a particular punch operating lever 98 is not released by its detent 108, the right end of the punch operating lever will move downward and upward and the related punch will not be operated. If the punch selecting lever is released by its detent before the shaft 102 begins to rotate, the right end of the punch operating lever will be held by the hook on the punch selecting lever and the punch 95 will be moved downward through the tape, then upward to normal position, as the shaft executes one revolution. The punch selecting lever pertaining to the operating lever of the feed hole punch being always engaged, the feed hole will always be punched.

The feed sprocket 94 is fixed upon a shaft represented by the dot and dash line 115, to which is also fixed a ratchet wheel 116 and a detent wheel 117. A ratchet dog 118 pivoted on the lower end of a tape feed lever 119 has a tooth 120 to engage a tooth of the ratchet wheel 116 and is pulled in counterclockwise direction by a spring 121 attached to the dog 118 and anchored to a stationary pin 122. The tape feed lever is freely pivoted on a supporting rod represented by the dot and dash line 123 and has journaled upon it a small roller 124 which bears upon a cam 125 secured to the shaft 102. When the shaft rotates in the direction of the arrow, the tape feed lever 119 is allowed to swing to the right under the pull of the spring 121, and the tooth of the tape feed dog ratchets over one tooth of the feed ratchet wheel 116. As the cam 125 approaches the end of its revolution, the tape feed lever 119 is swung to the left and the tape feed shaft 115 is stepped forward in a counterclockwise direction. This occurs after the punches have penetrated the tape and returned to a position clear of the tape. When the tape feed lever 119 reaches the left end of its feed movement, a nose 126 on its lower end strikes a tooth of the detent wheel 117 and prevents overdrive. This nose also remains in blocking relation to the detent wheel when the shaft 102 has been latched in idle position.

*Back space mechanism.*—The feed sprocket shaft 115 also has fixed to it a back space ratchet wheel 130 (Figs. 9 and 10), the teeth of which face in the opposite direction to those of the feed ratchet wheel 116. A back space dog 131 has a tooth 132 adapted to cooperate with a tooth of the back space ratchet wheel in back space operations. This dog is pivoted near the lower end of a back space lever 133 pivotally mounted on the rod 123. The lower end of the back space lever is held to the left (Fig. 10) by a spring 134 anchored to a fixed bracket 135. A small roller 136 journaled on the back space lever engages a cam 137 keyed to the main shaft 102. The back space lever 133 oscillates on each rotation of the main shaft, but the dog 131 is normally held, against the action of a spring 138, out of engagement with the ratchet wheel 130, by means of a pin 139 on the end of an arm 140 fixed to a latch segment 141. The latch segment is pivoted on the shaft 115 and normally latched by a detent 142 against the pull of a spring 143. The detent 142 is fixed to the armature 144 of a back space magnet MBS mounted on a fixed part, the armature being pivoted at 146. When the back space magnet is energized, the armature is lifted against a stop 147 and the detent 142 is released from the segment 141. The segment moves clockwise a short distance, under the pull of spring 143, lifting the pin 139 and allowing the dog 131 to engage the ratchet wheel 130.

Figures 9, 10, 11:
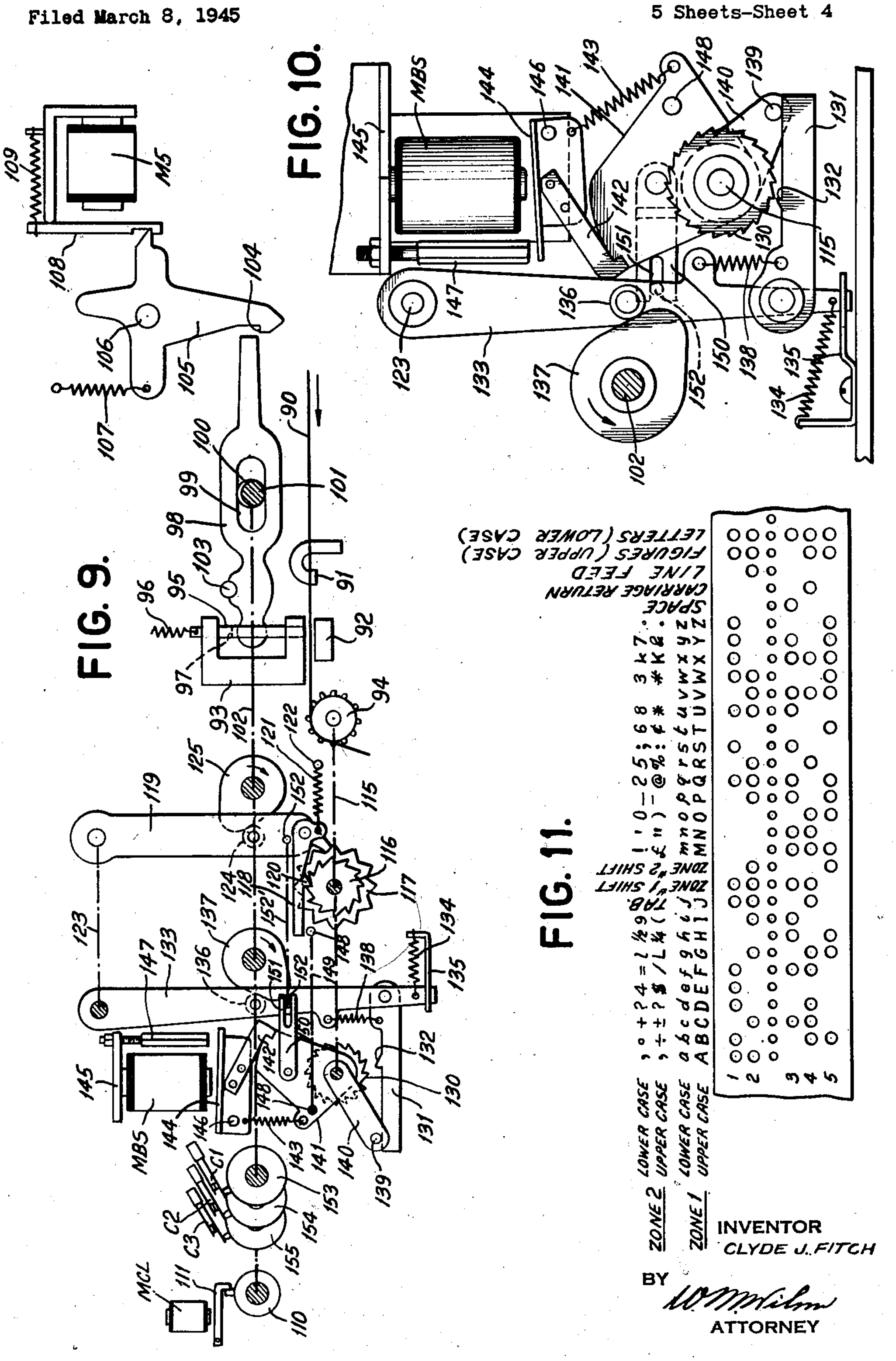
Fig. 9 is a diagrammatic view of the tape punch.
Fig. 10 is a vertical section through part of the tape punch, showing a rear elevation of the back space mechanism.
Fig. 11 is a section of tape showing the code employed.

At the same time a pin 148 projecting from the latch segment 141 and extending under the feed dog 118, as indicated by the dot and dash line 149 in Fig. 9, raises the feed dog out of contact with the feed ratchet 116. When the main shaft 102 rotates, the back space dog 131 immediately swings to the left (Fig. 9), turning the feed sprocket shaft back one step, then returns to the right into its normal position. Pivoted to the latch segment 141 is a restoring link 150 having at its right end, as seen in Fig. 9, a fork 151 which engages over a pin 152 projecting from the feed lever 119, as indicated by dot and dash line 152'. When the latching segment 141 is released by its detent 142, the restoring link 150 moves to the right until the bottom of its fork comes against the pin 152. Near the end of the cycle the feed lever 119 swings to the left, and restores the latching segment 141 to latched position, the back space magnet having meanwhile been deenergized. As the end of the restoring movement is approached, the pin 139 engages the back space dog and removes it from contact with the ratchet wheel. At the same time the pin 148 allows the feed dog 118 to return to normal position.

Figure 12:
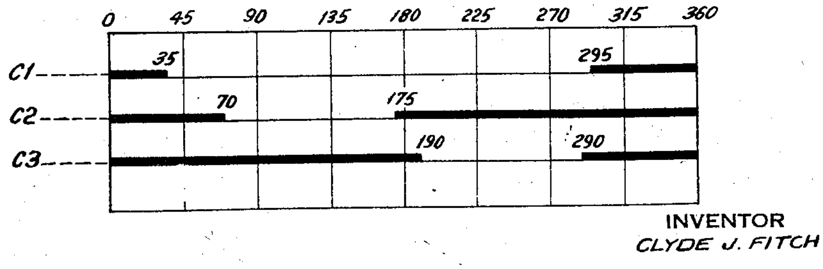
Fig. 12 is a timing diagram of certain cam contacts of the punch.

The main shaft also carries three cams 153, 154, 155 operating respective cam contacts C1, C2, C3, in accordance with the timing diagram shown in Fig. 12.

*Operation*

Figure 13:
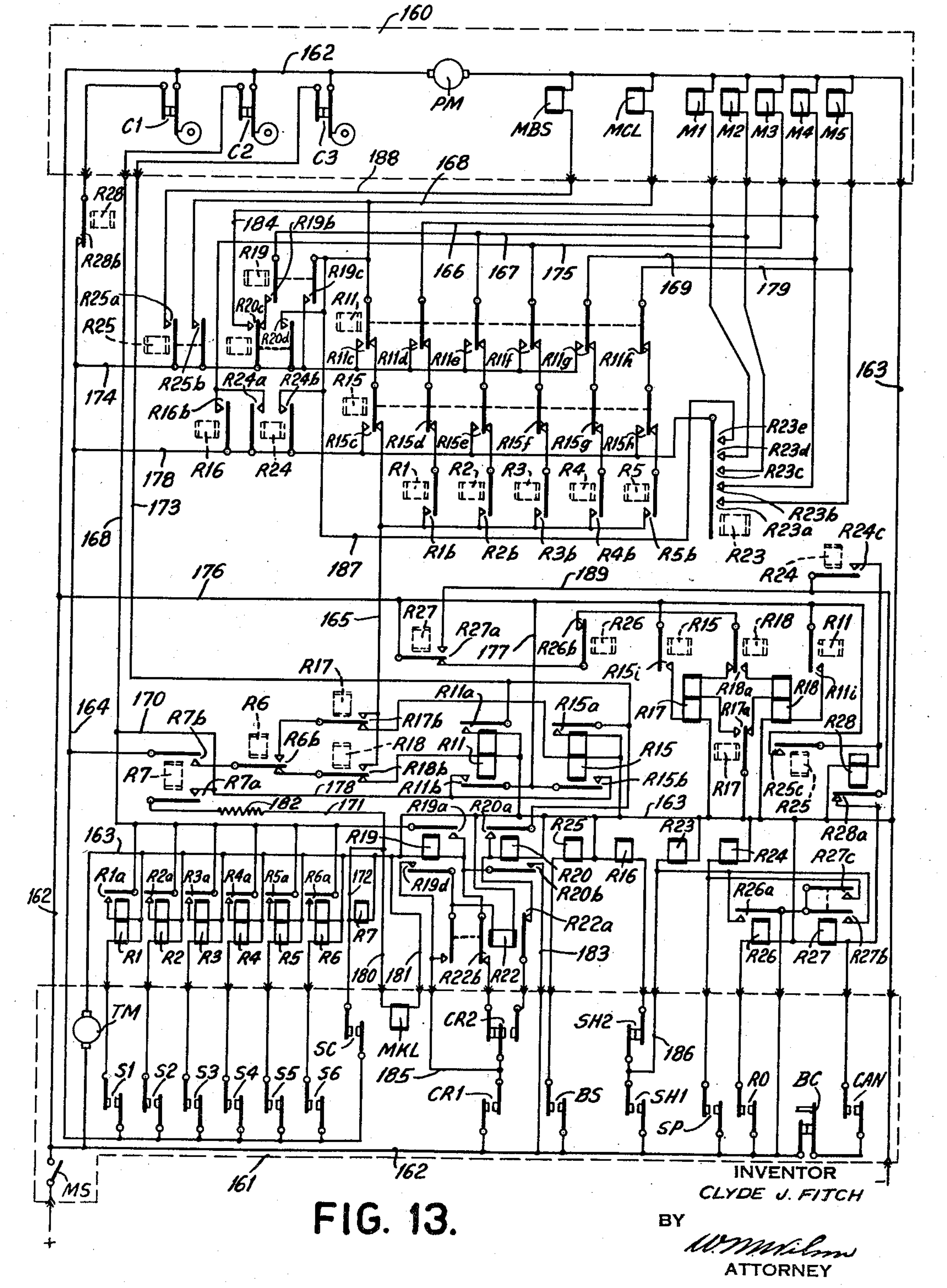
Fig. 13 is a circuit diagram of the entire apparatus.

The circuit diagram (Fig. 13) shows parts pertaining to the punch enclosed within a dot and dash line 160; parts pertaining to the typewriter enclosed within a dot and dash line 161; and intermediate parts constituting a relay gate. The typewriter motor TM and punch motor PM start when main switch MS is closed by switch lever 46 (Fig. 5). Their circuits extend from positive terminal +, through switch MS, positive wire 162, the motors TM and PM, negative wire 163, to the negative terminal —. When typing continues in one zone, the code magnets M1—M5 are directly energized in various combinations through a circuit which will be referred to herein as the normal circuit. Suppose the letter *a* key is operated, which is a key in zone 1, and that previously a key in the same zone had been operated. The permutation bars of the typewriter will close the contacts S1 and S2 in accordance with the code 12 for the letter *a*. These contacts complete circuits extending from the positive wire 162, through normally closed cam contact C1, normal contacts R28*b*, wire 164, the contacts S1 and S2, the pick-up coils of relays R1 and R2 to the negative wire 163, energizing said relays. Contacts R1*a* and R2*a* close, completing holding circuits for relays R1 and R2 from wire 162, through normally closed contact C2, wire 168, contacts R1*a* and R2*a*, the holding coils of relays R1 and R2, to wire 163.

cal construction, being operated by the slides 25 pertaining to the space bar SP and the carriage return key CR, respectively.

Figure 6:
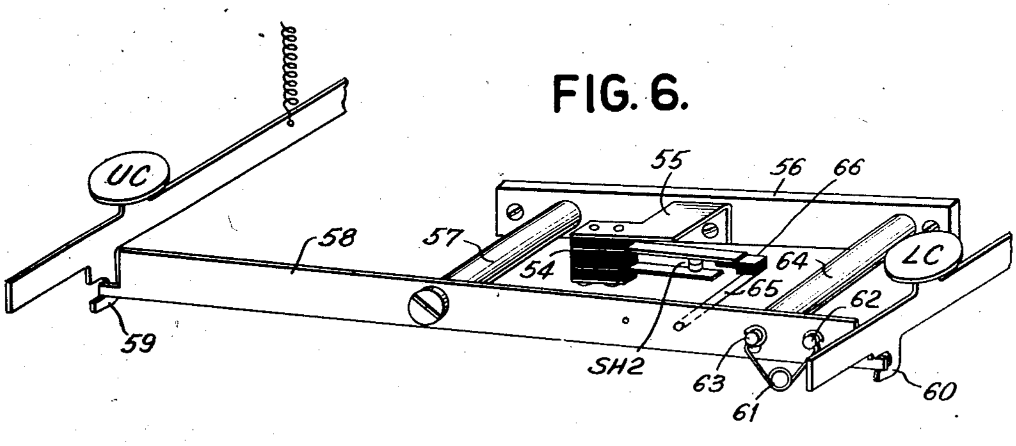
Fig. 6 is a detail perspective view of the case shift operating mechanism.

Fig. 6 shows another contact SH2 identified as shift contact No. 2. It comprises a pair of contact springs mounted in a block of insulation 54 carried by a bracket 55 secured to a fixed bar 56 attached to the frame of the machine. Pivotally supported on a post 57 projecting rigidly from the bar 56 is a lever 58, the left end of which engages in a hook 59 on the upper case shift key lever UC, while its right end engages a hook 60 of the lower case shift key lever LC. A toggle spring 61 has one end engaged with a pin 62 on the lever 58, the other end with a pin 63 at the end of a second rigid post 64 extending through a slot in the lever 58. A pin 65 projects rearwardly from the lever 58 to engage under an insulating strip 66 on the upper contact spring of contact SH2. The mechanism is shown in the normal position for lower case operation. When the upper case shift key UC is depressed, the lever 58 is rocked counterclockwise and held in its new position by the toggle spring 61. In its rocking movement the pin 65 lifts the upper contact spring and opens the contact SH2. When the lower case shift lever is operated, the action is reversed and the contact closes.

The basket shift mechanism controlled by the key UC is disclosed in Patent No. 1,945,097 and is not duplicated herein. It is a characteristic of this mechanism that the related cam 11 is allowed to execute one-half revolution when the upper case key is depressed and another half revolution when said key is released. Thus, the appertaining slide 25 (Fig. 1) in the present machine is operated once when the key UC is depressed and again when the key LC is depressed, and closes the contact SH1 each time. The relative timing of the contacts SH1 and SH2 is such that when the key UC is depressed the contact SH2 opens first and stays open, then the contact SH1 closes momentarily, while depression of the key LC causes the contact SH2 to close first and stay closed, followed by momentary closure of the contact SH1.

Fig. 2 shows a set of transfer contacts CR2 identified as the carriage return contacts No. 2. These contacts comprise contact springs mounted in a block of insulation 68 on a fixed part of the frame. The transfer contact spring 69 has a prong 70 extending through a hole in the lower contact spring 71 to engage a strip of insulation on an operating spring 72. The latter has an offset flange on which is journaled a small roller 73 positioned adjacent the reel 74 on which the carriage return tape (not shown) is wound. This reel has attached to it at an exactly determined position a small block 75 which, when the carriage reaches its extreme left position, moves under the small roller and transfers the contacts CR2.

Figure 7:
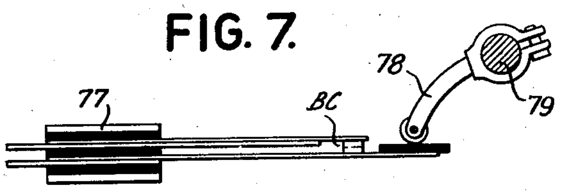
Fig. 7 is a detail sectional view showing the basket shift contact operating mechanism.

Figs. 2 and 7 show a contact BC which is used to indicate the position of the type basket. It comprises two contact springs mounted by an insulating block 77 on a fixed part of the frame. The lower contact spring extends under the end of an operating arm 78 secured to a rock shaft 79. This rock shaft is the same as shaft 15 in Patent No. 1,945,097 and, as described in said patent, executes a counterclockwise rocking movement when the basket is moved to upper case position and a reverse movement on return of the basket to lower case position. The contact BC is therefore closed when the basket is in lower case position and open when the basket is in upper case position.

Figure 8:
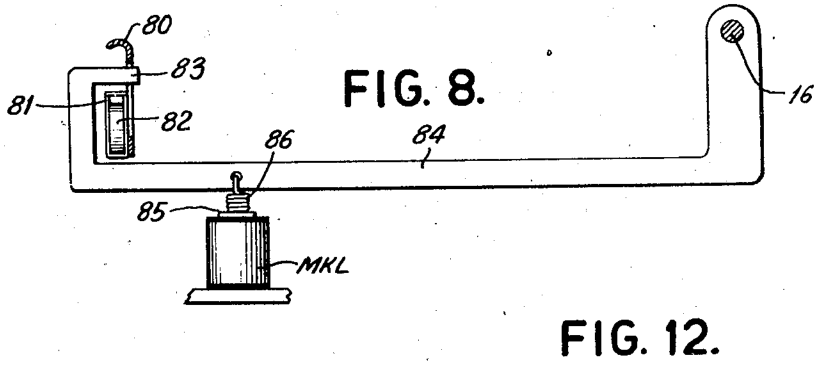
Fig. 8 is a detail vertical sectional view showing the keyboard locking mechanism.

Figs. 1 and 8 show a keyboard locking mechanism of the type disclosed in the Tholstrup Patent No. 2,255,030. Associated with the key lever guide comb 80 is a stationary channel-shaped member 81 containing a set of small rollers 82, only one of which appears in each figure. The ends 83 of the key levers hang over the channel-shaped member and, when depressed, are thrust into related slots of the channel-shaped member and between two adjacent rollers. The rollers are so spaced in the channel-shaped member as to permit only one key lever to enter at a time. A keyboard locking lever 84, pivoted on the key lever rod 16 extends under the channel-shaped member, then up and over the same, in position to drop through a related slot in the channel-shaped member between two of the rollers. The keyboard locking lever is operated by a solenoid MKL mounted on a fixed part of the frame and having an armature 85 articulated by a stiff spring 86 to the locking lever.

*Tape punch*

The punch is similar in construction to the one shown in Patent No. 2,346,267 but has, in addition, a back space mechanism. Accordingly, the main operative parts of the punch are shown only diagrammatically in Fig. 9 while the back space mechanism is shown in detail in Fig. 10. A blank tape 90 is fed from a reel (not shown) over a tape guide 91, between a die block 92 and a punch guide block 93, over a feed sprocket 94, and then off to a take-up reel (not shown).

There are six punches 95 supported for vertical reciprocation in the punch guide block 93 and normally held in upper position by springs such as 96. Only one punch is shown in Fig. 9, the others being directly behind it, distributed across the tape. The positions of the punches are indicated by the horizontal rows of perforations in the tape shown in Fig. 11. The five numbered rows are code perforations, while the small holes in the unnumbered row are feed holes. Each punch has a vertical slot 97 in which engages the end of a punch operating lever 98, the middle portion of which has an elongated opening 99 through which passes an eccentric portion 100 of a shaft 101 represented by the dot and dash line 102. The eccentric 100 is shown at its highest position. In this position a notch in the punch operating lever 98 rests against a cross rod 103 while the right end of the punch operating lever is positioned just above a hook 104 on the lower end of a related punch selecting lever 105. There are six of these punch selecting levers 105, one for each punch operating lever, each pivotally mounted on a rod 106 and urged in a clockwise direction by an individual spring such as 107. The punch selecting lever shown in Fig. 9 is the one pertaining to the code punch operating lever which operates the No. 5 punch. It has a rightwardly extending arm normally latched by the armature 108 of a coding magnet or punch selecting magnet M5. The armature is normally held by a spring 109 in position to latch the punch selecting lever 105, but when attracted by the related magnet releases the punch selecting magnet and allows it to move its hook under the right end of the related punch operating lever. The punch selecting lever pertaining to the feed hole punch has no rightwardly extending arm and no detent mechanism; conse- The common contact SC closes just after the contacts S1 and S2, extending a circuit from the wire 164, through said contact SC, common relay R7, to the wire 163, energizing said relay. Contact R7a closes, completing a holding circuit from wire 168, through wire 170, contact R7a, wires 171 and 172, coil of relay R7, to wire 163.

Since it was assumed that a key in zone 1 had previously been operated, the relay R18 will be in energized condition (the manner in which it is energized will be explained presently). The contact R18b is therefore in transferred position. When the relay R7 is energized, its contact R7b closes completing the normal circuit as follows: From positive wire 162, through normally closed contact C1, normal contact R28b, wire 164, contact R7b, normal contacts R6b, transferred contact R18b, wire 165, contacts R1b, R2b, normal contacts R15d and R15e and R11d and R11e, wires 166 and 167, code magnets M1 and M2 to the negative wire 163, energizing said code magnets. A circuit also extends from wire 165, through normal contacts R15c and R11c, wire 168, punch clutch magnet MCL to the negative wire 163, energizing said clutch magnet. The main shaft 102 now executes one revolution, in the course of which the tape is perforated in positions 1 and 2, in the manner previously described. When the main shaft of the punch has rotated through 35°, the cam contact C1 opens, breaking the normal circuit and deenergizing the code magnets M1 and M2 and the clutch magnet MCL. At 70° the cam contact C2 opens, breaking the holding circuit of storage relays R1 and R2.

If the key operated had been in zone 2, and if another key in the same zone had been previously operated, the procedure would have been similar, but with the following differences. The relay R18 will be deenergized and the relay R17 energized, for reasons to be explained later. Hence, the contact R18b will be normal and the contact R17b transferred. Assume that the key operated is the figure 5 key, a key in zone 2 having code 246. The storage relays R2, R4 and R6 will be energized and their holding circuits completed in the same manner as previously described for relays R1 and R2. Now when the common relay R7 is energized and contact R7b is closed, the normal circuit extends from contact R7b, through transferred contacts R6b and R17b, thence through wire 165, contacts R2b and R4b, normal contacts R15c, R15e and R15g and normal contacts R11c, R11e and R11g, wires 167 and 169, clutch magnet MCL and code magnets M2 and M4, to negative wire 163, energizing said magnets. Thus, the punch goes through a cycle in which the 2 and 4 positions are perforated. The No. 6 code position, which appeared on the storage relays, does not appear as a perforation in the tape.

Now assume that the machine is in normal condition with neither of relays R17 nor R18 energized, the main switch MS having just been closed, and that the *a* key is operated. The storage relays R1 and R2 are energized as before and are held through their contacts R1a and R2a and the cam contact C2. Also, the common relay R7 is energized and is held through its contact R7a. Now when contact R7b closes, a circuit extends from wire 164, through said contact, through normal contacts R6b and R18b, the pick-up coil of relay R11 to negative wire 163, energizing said relay. The contact R11a closes, completing a holding circuit extending from the positive wire 162, through normally closed cam contact C3, wire 173, contact R11a, the holding coil of relay R11 to negative wire 163. Contact R11b closes, completing a shunt circuit around cam contact C2 extending from positive wire 162, through wires 176 and 177, contact R11b, wires 178, 170, and 168, contacts R1a and R2a, the holding coils of relays R1 and R2, to wire 163; also through contact R7a, closed at this time, wires 171 and 172, coil of relay R7, to wire 163. Also, the contacts R11c—R11h transfer, disabling the normal circuit and completing a circuit directly from wire 164, through wire 174, transferred contacts R11c—R11g, wires 168, 166, 167, 175 and 169, clutch magnet MCL and code magnets M1—M4, to the negative wire 163, energizing said magnets. The punch now goes through a cycle in which the code 1234 is perforated in the tape. This is the zone 1 code.

Concurrently, the contact R11i closes, completing a circuit from positive wire 162, through wire 176, contact R11i, the pick-up coil of relay R18, to the negative wire 163, energizing said relay. Contact R18a transfers, completing a holding circuit for relay R18 starting from the positive wire 162, through wire 176, normal contacts R27a and R26b, transferred contact R18a, the holding coil of relay R18, normal contact R17a, to the negative wire 163. Contact R18b transfers, but without immediate effect because the normal circuit is disabled at the time as previously explained. At 35° the cam contact C1 opens, dropping out the clutch magnet MCL and the code magnets M1—M4. At 70°, the cam contact C2 opens, but without effect on the holding circuit of the storage relays R1 and R2 and common relay R7, because the contact C2 is shunted at the time through the previously traced circuit including the contact R11b. At 175° the contact C2 closes again, to maintain the holding circuits of the storage relays and the relay R7 until the following cycle. At 185° the contact C3 opens, breaking the holding circuit of relay R11, which becomes deenergized, opening the holding circuits through the contact R11b and restoring the circuit at contacts R11c—R11h. At 295° the contact C1 closes, completing the normal circuit through contact R7b, normal contact R6b, transferred contact R18b, wire 165, contacts R1b and R2b, normal contacts R15c—R15e and normal contacts R11c—R11e, wires 168, 166, 167, clutch magnet MCL and code magnets M1 and M2, to the negative wire 163, energizing said magnets. Thus, the punch is caused to perforate the code 12 in the tape. If further typing in zone 1 follows, the impulses are transmitted immediately through the normal circuit, when contact R7b closes.

Now if a key in zone 2 is operated, for instance, the figure 5 key, having the code 246, the storage relays R2, R4 and R6 are energized in the manner previously described and, when relay R7 is energized and contact R7b closes, a circuit extends through contact R7b, transferred contact R6b, normal contact R17b, the pick-up coil of relay R15, to the negative wire 163. The contact R15a closes, completing a holding circuit for the relay R15, through cam contact C3, wire 173, contact R15a, holding coil of relay R15, to the negative wire, energizing said relay. Contact R15b closes, to maintain the holding circuit of the storage relays through the open time of contacts C2, through a circuit similar to the one previously traced through contact R11b. Contacts R15c—R15h transfer, disabling the normal circuit and completing circuits directly from wire 164, through wire 178, transferred contacts R15c, R15e, and R15h, normal contacts R11c, R11e, and R11h, wires 168, 167, 179, clutch magnet MCL and code magnets M2 and M5, to the negative wire 163, energizing said magnets. The punch is thus caused to perforate the combination 25 in the tape which is the zone 2 code. Meanwhile the contact R15i has closed, completing a circuit from the positive wire 162, through wire 176, through contact R15i, the pick-up coil of relay R17, to the negative wire, energizing said relay. Contact R17a transfers, breaking the holding circuit to relay R18, which becomes deenergized allowing its contact R18a to return to normal position, to establish a holding circuit for relay R17, extending from positive wire 162, through wire 176, normal contacts R27a, R26b, and R18a, holding coil of relay R17, transferred contact R17a, to the negative wire 163. The relays R2, R4, R6 and R7 are held over to the following cycle by the previously described sequential operation of cam contacts C2 and C3. The cam contact C3 opens the holding circuit of relay R15 at 185°; the relay becomes deenergized, restoring the normal circuit. Then, when contacts C1 close again at 295°, the code magnets M2 and M4 and the punch clutch magnet are energized through the normal circuit, as previously traced.

It will be observed that the zone shift detecting relays R11 and R15 are subject to the control of the supervisory relays R17 and R18; that is to say, when either one of the zone shift detecting relays R11 or R15 is operated, its pick-up circuit is disabled by the corresponding supervisory relay R17 or R18 and is so maintained until the other zone shift detecting relay is operated. Thus, the zone signals are inserted only when there is a shift from one zone to the other, or when starting with the supervisory relays in the normal, deenergized condition.

The keyboard locking magnet MKL is connected in parallel to the relay R7 by wires 180 and 181. Thus, in the normal operation continuing in one zone, the keyboard locking magnet remains energized only from the time the common contact SC is closed until the cam contact C2 opens at 70°. However, in an initial operation, or one involving a shift from one zone to another, the circuit of the keyboard locking magnet is maintained energized until the following cycle, through the contacts R11b, or R15b, contact R7a, wires 171 and 180, coil of magnet MKL, and wire 181, to wire 163. A resistance 182 reduces the current through the locking magnet and the common relay R7 so that they will not be heated under these circumstances.

*Carriage return and line feed.*—The contact CR2 is in the condition shown, when the carriage is in the returned position. In all other positions of the carriage, the contact CR2 is transferred. When the carriage return key CR is pressed, the carriage not being in returned position, the carriage return code, which is 4, is to be punched in the tape, followed by the line feed code, which is 2. When the carriage is in the returned position, pressing carriage return key is to cause only the line feed code to be punched. The separate line feed signal is required for some types of page printers while for others the separate line feed signal is merely superfluous.

If the key CR is operated with the carriage in the returned position, closure of the contact CR1 completes a circuit from wire 162, through said contact CR1, normal contact CR2, normal contact R22b, coil of relay R19, to the negative wire 163, energizing said relay. Contact R19a closes, completing a holding circuit for the relay R19 through wire 168 and cam contact C2. The contact R19b closes, completing a circuit through cam contact C1, wire 164, normal contact R20c, said contact R19b, wire 167, code magnet M2, to the negative wire 163. The contact R19c closes, completing a circuit from wire 174 through said contact and wire 168 to the punch clutch magnet MCL. Thus, the punch is made to perforate the code 2, which is the line feed code. The relay R19 is deenergized when contact C2 opens.

If the key CR is operated when the carriage is not in returned position, a circuit is completed from wire 162, through contact CR1, transferred contact CR2, normal contact R22a, the coil of relay R20 to the negative wire 163, energizing said relay. Contact R20a closes, completing a holding circuit for relay R20 through wire 173 and cam contact C3. Contact R20b closes, completing a circuit from wire 162, through wire 183 and said contact, the coil of relay R19, to the negative wire 163, energizing said relay. Contact R19a closes the holding circuit for relay R19 through cam contact C2 as before. Contact R20c transfers before contact R19a closes, completing a circuit from wire 174, through said transferred contact R20c, wire 184, code magnet M4, to the negative wire 163, energizing said magnet. Contact R20d closes, completing a circuit from wire 174, through said contact, and wire 168 to the punch clutch magnet MCL, energizing said magnet. Thus, the punch perforates code 4 in the tape, which is the carriage return code.

At 70° contact C2 opens, but the relay R19 does not drop out, because it is held through the contact R20b. Contact C2 closes again at 175° and contact C3 opens at 190°, deenergizing relay R20. Contact R20c transfers to normal position and the previously traced circuit through said contact and the contact R19b to the code magnet M2 is completed; also the circuit through contact R19c to the punch clutch magnet MCL. Thus, the punch is made to perforate code 2 in the tape, the line feed code. At 70° of the cycle following the operation of the key CR, the relay R19 is deenergized, by the opening of cam contact C2, and the circuit returns to normal at the end of that cycle.

In the typewriter shown in Fig. 1, the cam which is operated by the power roller in response to the key CR is a single lobed cam, not a double lobed cam as shown in Fig. 1 (see Patent No. 2,098,319). Accordingly, it takes somewhat longer to complete its operation. This might cause a repeat perforation of the carriage return and line feed codes in the tape. To avoid this possibility the relay R22 is provided. When the relay R19 is energized, in the manner previously described, the contact R19d closes, completing a circuit from wire 162, through the contact CR1, closed at that time, wire 185, said contact R19d, and the coil of relay R22, to the negative wire 163, energizing said relay. The contact R22a opens the pick-up circuit to relay R20 and the contact R22b opens the pick-up circuit to relay R19. The contact R22c closes, completing a holding circuit for the relay R22, through said contact and the contact CR1. Thus, the relay R22 remains energized as long as the contact CR1 is closed and prevents the relays R19 and R20 from being picked up a second time for one closure of the contact CR1.

Operation of the space bar of the typewriter closes the contacts SP, completing a circuit from wire 162, through the coil of relay R24, to the negative wire 163, energizing said relay. Contacts R24*a* and R24*b* complete circuits through wires 175 and 168 to the code magnet M3 and the punch clutch magnet MCL, respectively. Thus, the punch is caused to perforate code 3 in the tape, which is the space code.

*Upper and lower case shift circuits.*—The operation of the case shift contacts SH1 and SH2 has been previously described. It will be remembered that their timing is such that, when the key UC is operated, the contact SH2 opens first and stays open and the contact SH1 then closes, whereas when the key LC is operated the contact SH2 closes first and stays closed and the contact SH1 then closes. Thus, when the key UC is operated, a circuit is completed from wire 162, through contact SH1, wire 186, relay R23, to the negative wire 163, energizing said relay. The contacts R23*a*—R23*e* close, completing circuits from wire 178 to the code magnets M5, M4, M2 and M1 and through wires 187 and 168 to the punch clutch magnet MCL. The punch therefore perforates the code 1245 in the tape, which is the upper case, or figures code.

When the key LC is operated, a circuit is completed as before through the coil of relay R23 and another circuit is completed through contact SH2 and the coil of relay R16 to the negative wire, energizing said relays. The contacts R23*a*—R23*e* complete circuits to the code magnets M5, M4, M2 and M1 and the punch clutch magnet MCL as before, and the contact R16*b* completes a circuit through wire 175 to the code magnet M3, causing the punch to perforate the code 12345 in the tape, which is the lower case, or letters code.

*Back space circuit.*—When the back space push button BS is operated, the contacts BS close, completing an obvious circuit through the coil of relay R25, energizing said relay. The contact R25*a* completes a circuit through wire 188 to the back space magnet MBS, while the contact R25*b* completes a circuit through wire 168 to the punch clutch magnet MCL. The punch therefore executes a back space cycle. To prevent a repeat operation, if the back space key is held down, contact R25*c* closes, completing a circuit from wire 176, through said contact and the coil of relay R28 to the negative wire. This relay is slugged, as indicated, and becomes energized slowly, to open its contacts R28*b*, breaking the circuit to all the punch magnets.

*Cancel circuit.*—After back spacing the desired number of steps, the cancel push button CAN can be operated to cancel the erroneous recordings. The cancel circuit can be made operative only when the type basket is in the lower case position, for a reason to be explained presently. In this position of the type basket the contact BC is closed. If the cancel push button CAN is then operated, a circuit is completed from wire 162, through contacts BC and CAN and the coil of relay R27, to the negative wire 163, energizing said relay. Contact R27*a* transfers, completing a holding circuit for relay R27 from wire 176 through transferred contact R27*a*, wire 189, normally closed contact R28*a* and the coil of relay R27, to wire 163. Contacts R27*b* and R27*c* close, completing circuits through the coils of relays R23 and R24 respectively, and causing said relays to become energized. This combination of relays causes the code 12345 to be perforated in the tape as previously explained. This is the lower case code, which is used to cancel errors. Contact R24*c* closes, completing a circuit from wire 176, through transferred contact R27*a*, wire 189, contact R24*c*, coil of relay R28, to wire 163, causing said relay to become energized with a retarded action. Contact R28*a* opens, breaking the holding circuit of relay R27, after the cancel cycle has been assured. Contact R28*b* also opens, to prevent a repeat operation, if the cancel push button should be held down.

*Tape run-out circuit.*—When the run-out push button RO is operated, the contact RO closes, completing a circuit through the coil of relay R26 and energizing said relay. Contact R26*a* closes completing a circuit through said contact and the coil of relay R23 to the negative wire, energizing said relay. As previously explained, this relay causes the code 1245 to be perforated in the tape. However, if the type basket is in lower case position, the contact SH2 is closed and the circuit is extended through wire 186 and said contact and the coil of relay R16, to the negative wire, energizing this relay also. In this case the code 3 is added to the codes 1245, so that the code 12345 is punched. As long as the run-out push button is held down the relay R26 remains energized and each time cam contact C1 closes at 295° the punch magnets will be reenergized and the punch will punch another run-out code.

*Shift circuit synchronism.*—When the main switch MS is first turned on, the supervisory relays are in the normal deenergized condition. Consequently, when a key is depressed, the proper zone shift signal is punched in the tape. It is desirable to have a zone shift signal punched at the beginning of each message. Otherwise, it would be possible for a translating typewriter to get out of step with a punching typewriter, as to zone. For this purpose the relay R26, which is energized when the run-out button RO is depressed, is provided with normally closed contact R26*b* in the holding circuit of the supervisory relays. This contact opens to restore the supervisory relays to normal condition, whenever the run-out push button is pressed. Consequently, the first key operated in starting the following message will cause the proper zone shift signal to be inserted.

The same precaution is required in the case of a cancellation, since a zone shift signal might be cancelled. The holding circuit of the supervisory relays accordingly extends through normally closed contact R27*a*. When the cancel push button CAN is pressed, the relay R27 is energized and its contact R27*a* transfers, breaking the holding circuit of the supervisory relays and restoring them to normal condition.

Similar precautions are required in respect to the case shift signals. It has already been explained how the punch is made to perforate code 1245 in the tape, if the type basket is in upper case position, but code 12345 if the basket is in lower case position. If the tape is broken between messages, the portion of the series of run-out signals remaining at the beginning of the following message will cause the translating typewriter to assume the proper case position.

To guard against elimination of case shift signals by cancellation, the cancellation circuit is made dependent upon the contact BC being closed, which is the position it assumes when the type basket is in lower case position. The cancel code is 12345, which is also the lower case code. Therefore, the translating typewriter will always be in lower case position at the end of a cancellation. Since the punching typewriter must be in lower case to cancel, the two typewriters will be in step.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a telegraphic code apparatus, a group of code magnets, a normal circuit including a source of current, and selecting contacts for selectively connecting said code magnets to said source of current; a group of storage relay magnets respectively controlling said selecting contacts, a keyboard, means operated by the keys of said keyboard for causing the selective energization of said storage relays in various combinations, the keys of said keyboard being classified in two zones, the combinations of storage relay magnets caused to be energized by the keys of one zone being different for each key, but duplicates of the combinations caused to be energized by the keys of the other zone, means to detect a shift from either zone to the other, in the operation of the keys, means controlled by said zone shift detecting means for disabling said normal circuit and for connecting certain ones of said code magnets to said source current, to cause a special combination of said code magnets to be energized constituting a zone shift signal, means to reenable said normal circuits, and means also controlled by said zone shift detecting means for causing the energized storage relays to be held until said normal circuit is reenabled.

2. In a telegraphic code apparatus, a keyboard comprising keys classified in either one of two different zones, a group of code devices, means operated by the keys of said keyboard for setting up different combinations of said code devices, each key in one zone setting up a different combination from all the other keys in the same zone, each key in the other zone setting up a combination different from those set up by all the other keys in said other zone, but identical to the combination set up by one of the keys in said first mentioned zone, two zone shift signal means each adapted to operate said code devices to set up respective special zone shift combinations, means whereby the first key operated in either zone will cause an operation of the corresponding zone shift signal means, supervisory means adapted to be conditioned to disable either one of said zone shift signal means, means operated by a zone shift signal means to condition said supervisory means to disable said last mentioned zone shift signal means against a second operation in succession, and means operated by the other zone shift signal means to modify the condition of said supervisory means to disable said other zone shift signal means against a second operation in succession and to restore said first mentioned zone shift signal means to ready condition.

3. In a telegraphic code apparatus, a keyboard comprising keys classified in either one of two different zones, storage means comprising means controlled by said keys to store different code combinations, each key in one zone causing the storage by said storage means of a combination different from those caused to be stored by all the other keys of said zone, each key in the other zone causing the storage by said storage means of a combination different from those caused to be stored by all the other keys of said other zone, but identical to the combination caused to be stored by one of the keys of said first mentioned zone, a group of code devices, means to operate said code devices combinationally under control of said storage means, two zone shift signal means adapted to cause the operation of special zone shift combinations of said code devices, respectively, means whereby the first key operated in either zone will cause an operation of the corresponding zone shift signal means, supervisory means adapted to be conditioned to disable either one of said zone shift signal means, means operated by a zone shift signal means to delay control of said code devices by said storage means and to condition said supervisory means to disable said last mentioned zone shift signal means, means operated by said supervisory means when so conditioned to restore control of said code devices to said storage means, means operated by the other zone shift signal means to delay control of said code devices by said storage means and to condition said supervisory means to disable said other zone shift signal means and to restore the previously disabled zone shift signal means to ready condition, and means operated by said supervisory means when so conditioned to restore control of said code devices to said storage means.

4. In a telegraphic code apparatus, a keyboard comprising keys classified in either one of two different zones, a group of coding permutation members operated in duplicated combinations by the keys of the two zones, an extra permutation member operated by all of the keys of one zone but not by any key of the other zone, supervisory means comprising two holding relays having mutually controlled holding circuits whereby energization of one relay breaks the holding circuit of the other relay, two pick-up relays one for each holding relay, comprising means for controlling the energization of the respective holding relays, circuits for said pick-up relays including normally closed contacts controlled by the respective holding relays, a relay controlled by said extra permutation member having contacts for rendering the circuits of said pick-up relays effective alternatively in dependence upon the zone of a depressed key, a group of code magnets, one for each of said coding permutation members, energizing circuits for said code magnets including the following: contacts selectively controlled by said coding permutation members, normally open contacts respectively controlled by said holding relays, and said contacts for rendering the circuits of said pick-up relays effective alternatively; the energizing circuits for said code magnets also including normally closed contacts associated with said pick up relays so that when either pick-up relay is energized said energizing circuits are disabled, and circuits controlled by each of said pick-up relays adapted to energize a special combination of said code magnets for each pick-up relay constituting a zone shift signal.

5. In a typewriter controlled punch of the kind comprising a normal circuit including means for selectively connecting code magnets of the punch to a source of current, under control of the keyboard of the typewriter; the combination with said normal circuit and said keyboard, of zone differentiating means operable by any one of a number of keys of the keyboard constituting one zone, but not by any one of a number of other keys of the keyboard constituting another zone, said normal circuit including two branch paths each including normally open contacts, and means controlled by said zone differentiating means for connecting said paths alternatively to said source of current, a pair of supervisory relays respectively controlling said normally open contacts, a pair of zone shift relays and means normally connecting the same respectively to said branch paths including normally closed contacts respectively operated by said supervisory relays, said supervisory relays having pick-up circuits respectively controlled by said zone shift relays and mutually controlled holding circuits, whereby energization of either supervisory relay breaks the holding circuit of the other supervisory relay, and means controlled by each of said zone shift relays for disabling said normal circuit and for connecting a special combination of said code magnets, individual to each zone shift relay, to said source of current, to cause the punch to punch a special combination of holes identifying the zone of the key last operated, each time the zone shifts, in the operation of the keys.

6. Telegraphic code apparatus as described in claim 4, wherein cyclically operable holding means is provided for said pick-up relays, adapted to hold an energized pick-up relay for less than one cycle.

7. Telegraphic code apparatus as described in claim 4, wherein storage relays are provided, one for each of said coding permutation members and one for said extra permutation member, said contacts selectively controlled by said coding permutation members being operated by the storage relays pertaining to the respective coding permutation members and said contacts for rendering the circuits of said pick-up relays effective alternatively being operated by the storage relay pertaining to said extra permutation member, a holding circuit for said storage relays, a holding circuit for said pick-up relays, cyclically operable contact means controlling said holding circuit for said storage relays adapted to open the related holding circuit during an intermediate portion of a cycle, cyclically operable contact means controlling the holding circuit of said pick-up relays adapted to open the related holding circuit during a later portion of a cycle, and a circuit including normally open contacts operated by each of said pick-up relays adapted to shunt said first mentioned cyclically operable contact means, whereby said storage relays are held to a following cycle whenever one of said pick-up relays is energized.

8. In a telegraphic code apparatus of the kind wherein the circuits of a group of coding magnets are selectively connected to a source of current by the contacts of related storage relays, the latter having holding circuits controlled by cyclically operated contacts and individual pick-up circuits including normally open contacts controlled by related coding permutation members operated in various combinations by a keyboard, the combination with said keyboard, of an extra permutation member adapted to be operated by any one of a number of keys of the keyboard constituting one zone, but not by any one of a number of other keys constituting another zone, zone shift means controlled by said extra permutation member, means operated by said zone shift means to disconnect said coding magnets from said storage relay contacts and to connect certain ones of said coding magnets to the source of current, whereby special combinations of said coding magnets are energized representing zone shift signals, and means operated by said zone shift means to shunt said cyclically operated contacts during their open time of one cycle to retain the stored combination for control of said coding magnets during the next cycle.

9. Telegraphic code apparatus as described in claim 8, wherein said zone shift means comprises two zone shift relays, two supervisory relays having pick-up circuits controlled by the respective zone shift relays and mutually controlled holding circuits, said zone shift relays having pick-up circuits containing contacts controlled by the respective supervisory relays.

10. In a telegraphic code apparatus, a keyboard comprising keys classified in either one of two different zones, a group of coding permutation members operated in duplicate combinations by the keys of the two zones, an extra permutation member operated by all of the keys of one zone but not by any key of the other zone, supervisory means comprising two holding relays and mutually controlled holding circuits therefor, whereby energization of one relay breaks the holding circuit of the other relay, two pick-up relays, one for each holding relay, circuits for said pick-up relays including normally closed contacts controlled by the respective holding relays, a relay controlled by said extra permutation member having contacts for rendering the circuits of said pick-up relays effective alternatively, in dependence upon the zone of a depressed key, a group of coding magnets, one for each of said permutation devices, normal energizing circuits for said coding magnets selectively controlled by said coding permutation members, means controlled by either of said pick-up relays for disabling said normal energizing circuits and for establishing special energizing circuits for certain of said coding magnets, to cause an operation of special combinations of said coding magnets constituting zone shift signals, and means to reenable said normally energizing circuits.

11. In a telegraphic code apparatus, a typewriter having a carriage, a carriage return mechanism, and a carriage return key, coding means, means controlled by said carriage return key for causing one kind of operation of said coding means, and means controlled in accordance with the position of said carriage for modifying the kind of operation of said coding means caused by said carriage return key.

12. In a telegraphic code apparatus, a typewriter having a carriage, a carriage return mechanism, and a carriage return key, coding means, means controlled by said carriage return key for normally causing a carriage return operation of said coding means followed by a line feed operation of said coding means, and means operated on movement of said carriage to fully returned position for suppressing the carriage return operation of said coding means when said carriage return key is operated and causing only a line feed operation of said coding means.

13. In a telegraphic code apparatus, a tape punch, a case shift signal mechanism adapted to cause said tape punch to perforate either of two different case shift signals in the tape, runout signal means adapted to cause said tape punch to perforate a succession of either of said two case shift signals in the tape, and means controlled by said case shift mechanism for determining which of the two case shift signals the punch is caused to perforate in response to operation of said run-out signal means.

CLYDE J. FITCH.

REFERENCES CITED

The following references are of record in the file of this patent:

UNITED STATES PATENTS

| Number | Name | Date |
|---|---|---|
| Re. 20,330 | Morton | Apr. 13, 1937 |
| Re. 22,377 | Potts | Sept. 14, 1943 |
| 606,007 | Goodson | June 21, 1898 |
| 940,377 | Ackerman | Nov. 16, 1909 |
| 1,830,700 | Hoover | Nov. 3, 1931 |
| 1,921,407 | Griffith | Aug. 8, 1933 |
| 1,966,386 | Haglund | July 10, 1934 |
| 1,988,943 | Griffith | Jan. 22, 1935 |
| 2,000,029 | Kleinschmidt | May 7, 1935 |
| 2,059,253 | Lasker | Nov. 3, 1936 |
| 2,165,237 | Doty | July 11, 1939 |
| 2,172,754 | Lasker | Sept. 12, 1939 |
| 2,346,267 | Mills et al. | Apr. 11, 1944 |
| 2,379,865 | Connery | July 10, 1945 |